W. D. NICKUM.
POWER TRANSMISSION MEANS.
APPLICATION FILED DEC. 17, 1918.
1,318,169.
Patented Oct. 7, 1919.
2 SHEETS—SHEET 2.
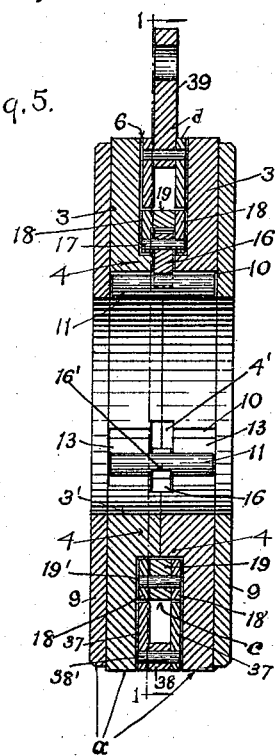
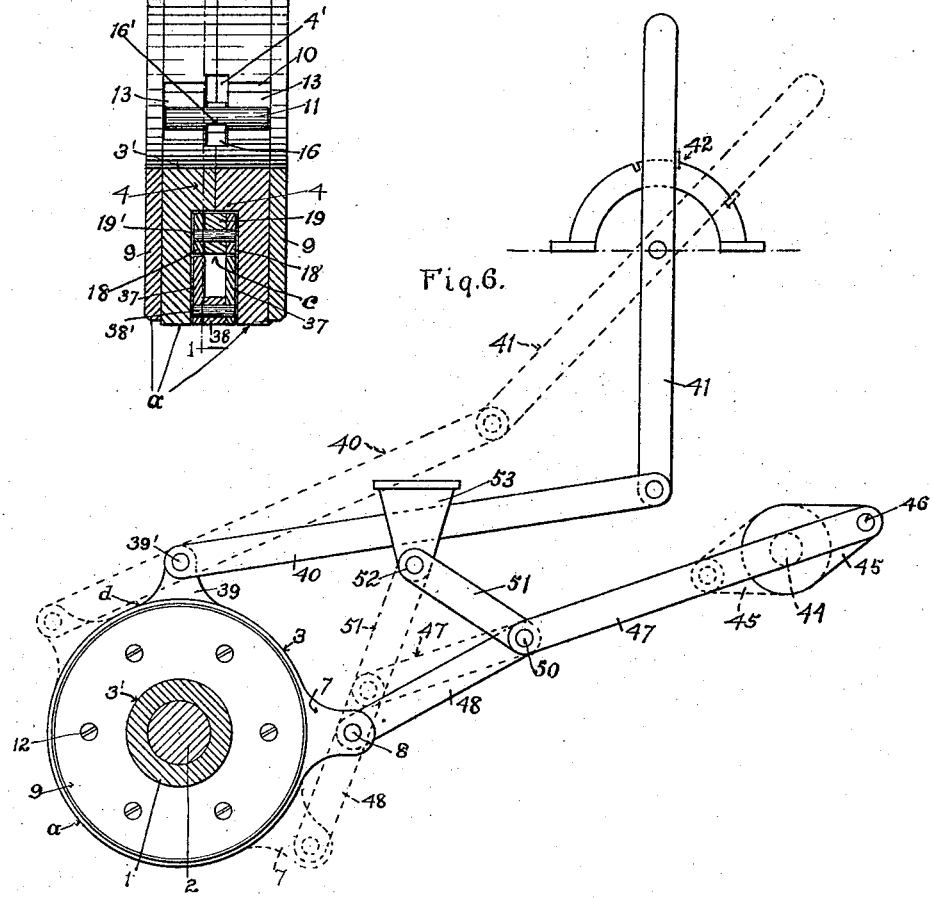
INVENTOR
Walter D. Nickum
BY
Arthur P. Knight
ATTORNEY

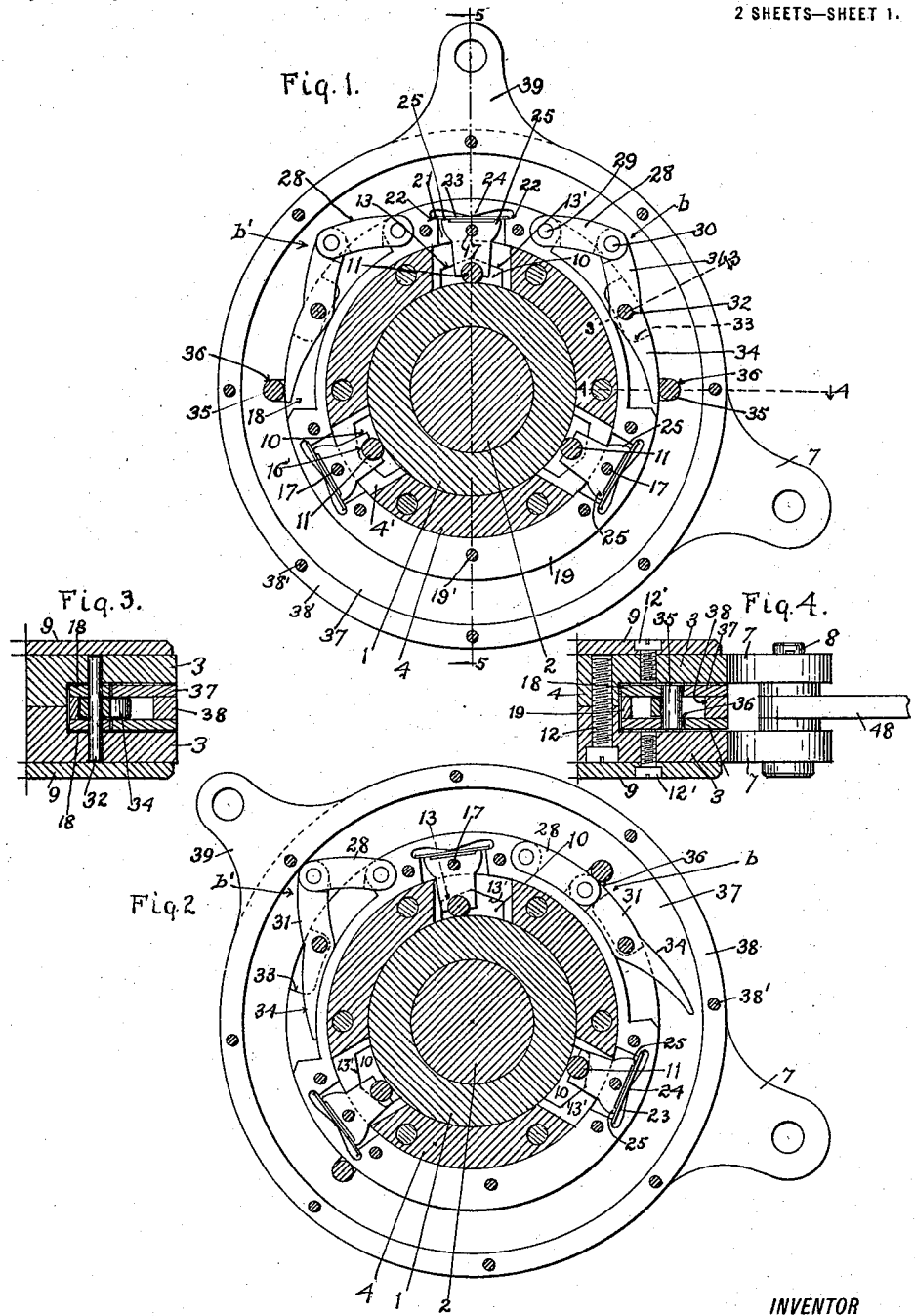

UNITED STATES PATENT OFFICE.

WALTER D. NICKUM, OF GLENDALE, CALIFORNIA.

POWER-TRANSMISSION MEANS.

1,318,169.      Specification of Letters Patent.      Patented Oct. 7, 1919.

Application filed December 17, 1918. Serial No. 267,193.

*To all whom it may concern:*

Be it known that I, WALTER D. NICKUM, a citizen of the United States, residing at Glendale, in the county of Los Angeles and State of California, have invented a new and useful Power-Transmission Means, of which the following is a specification.

This invention relates to means for transmitting power from a rotative shaft to a driven shaft with reduction of speed, the invention being particularly applicable to driving motor vehicles from the shaft of a gas engine, and the main object of the present invention is to provide effective and simple means for this purpose, which will be reliable and certain in operation and will be capable of reversal.

The accompanying drawings illustrate an embodiment of my invention, and referring thereto:

Figure 1 is a vertical section of the intermittent grip member constituting my invention taken on the line 1—1 in Fig. 5, the grip members being shown in normal position.

Fig. 2 is a view similar to Fig. 1, the grip member being shown in operative position.

Fig. 3 is a section on line 3—3 in Fig. 1.

Fig. 4 is a section on line 4—4 in Fig. 1.

Fig. 5 is a section on line 5—5 in Fig. 1 with the driven shaft removed.

Fig. 6 is a side elevation showing the controlling and operating means for intermittent grip devices.

My invention comprises an intermittent grip device of the construction shown in Figs. 1 to 5, said grip device being mounted on a sleeve 1 which is to be driven at reduced speed, and is rotatably mounted on, or keyed to, a shaft 2. Two annular plates or disks 3 are rotatably mounted on the sleeve 1 and are provided with inwardly extending annular flanges 4 which abut one another so as to form a continuous cylindrical surface surrounding the sleeve 1 and leaving an annular channel 6 between said annular members 3 in which the controlling members of the grip devices hereinafter referred to are mounted to oscillate around the axis of the shaft 2. Lugs 7 on the respective disks are connected by pin 8 which also serves as a pivotal connection for the operating means hereinafter referred to, the said disks 3 constituting the operating member of the grip device.

The respective annular members 3 are formed adjacent the bore 3' thereof, with recesses or slots 10 in which extend gripping rollers or chocks 11. Cheek plates 9 are provided outside of the respective disks 3 so as to close the respective slots 10 at both ends and retain the rollers or chocks 11 in place, said plates 9 and 3 being secured together by screws 12 and 12' to form a single oscillating operating member $a$. The outer faces of said recesses or slots 10 are inclined with reference to the radial direction from the axis of the shaft 2 so as to form two inclined faces 13 and 13' having reverse inclination in such manner that when the gripping roller or chock 11 is at one end of the slot it will be engaged by one of the said gripping faces in one direction of movement of the device and released in the opposite direction and when the roller is at the opposite end of the slot the gripping members' releasing action will be reversed. The position of the gripping rollers or chocks 11 in the respective slots 10 are controlled by the controlling means aforesaid through the operation of shifting arms or members 16, pivotally mounted by pins 17 on rings 18 which are mounted in the annular channel 6 aforesaid to rotate around the axis of the shaft 2. An intermediate ring 19 is connected by pins 19' to the rings 18 so that the two rings 18 and the ring 19 constitute a single annular member $c$ in which the shifting members 16 are pivotally mounted. Said intermediate ring 19 has recesses 21 to receive the shifting levers; each recess 21 having offset shoulders 22 against which rests a leaf spring 23 and the outer wall of each recess having an inward projection 24 bearing against the middle of said spring so that the spring is retained by engagement with the projection 24 and shoulders 22. Flanges 4 are recessed at 4' to permit free operation of shifting arms 16, and said arms are provided with recesses 16' engaging rollers 11 to shift the same. Each shifting member 16 is provided with two lugs or projections 25 at opposite sides of its pivot, which in the normal position of the lever, bear on the leaf spring 23 aforesaid so as to hold the shifting lever in neutral or normal position and to thereby hold the corresponding rollers or chocks 11 in central position in the respective slot 10, in which position it is free from engagement with both of the inclined faces of said slot. By moving the shifting arm 16 one way or another from this normal position the roller or chocks 11 may be moved into engagement with one or the other of said inclined faces. For effecting this shifting operation, I prefer to provide controlling means consisting of two toggles b and b', each toggle comprising a link 28 pivoted at 29 to the ring 19 and pivoted at 30 to a toggle lever 31 mounted on a pivot 32 which is secured to the annular plates or disks 3, the rings 18 being cut away at 33 to accommodate this pivot. Said toggle lever is provided with an arm 34 adapted to be engaged by a pin or roller 35 to move the toggle into normal buckled position, as shown in Fig. 1, and the outer face of the toggle link 31 is also adapted to be engaged by the pin 35 to flatten the toggle to extended position, as shown for toggle b in Fig. 2. The operating pins 35 for the toggles are seated in recesses 36 in rings 37, which are secured by pins 38' to an intermediate ring 38, so as to constitute a single annular member d adapted for operation of pins 35; ring 38 having a lug 39 connected by pin 39' to controlling means, as hereinafter set forth.

Referring to Fig. 6, the controlling means for the annular member d may consist of a link 40 pivoted on pin 39' and pivotally connected to controlling lever 41, which is provided with suitable means indicated at 42 for locking the same, either in normal position, or in forward or reverse position. The operating shaft, indicated at 44, is provided with crank 45 connected by crank pin 46 to connecting rod 47 having a pivotal connection with a link 48 which is pivotally mounted on the connecting pin 8 aforesaid, the pivot pin 50, connecting parts 47 and 48, being mounted on swinging lever 51 pivoted at 52 to a suitable supporting bracket 53.

In the operation of the apparatus, the rotation of shaft 44 causes the parts 47 and 48 to reciprocate in such manner as to cause oscillation of lugs 7 and the members 3 connected thereto, around the axis of shaft 2. When the parts are in the position shown in Fig. 1 and in full lines in Fig. 6, this oscillation of the operating member of the gripping device is without effect on the driven sleeve, but when the controlling lever 41 is moved to the position shown in the dotted lines in Fig. 6, lug 39 is moved so as to cause ring 37 to turn counter clockwise from the position shown in Fig. 1 so as to cause the respective pins 35 to assume the positions shown in Fig. 2. In this operation, the right hand pin 35 rides over the outer face of the corresponding toggle link 31, flattening out the toggle and causing the annular member c, consisting of parts 18 and 19, to be shifted counter clockwise with the result that the shifting levers 16 carried thereby are shifted in the same direction and force the respective rollers or chocks 11 into engagement with the left hand inclined faces 13. With the rollers in this position each ensuing movement of the operating member of the gripping device in a clockwise direction by the operation of the operating shaft 44, as aforesaid, will cause the rollers to be gripped between said inclined faces 13 and the periphery of the sleeve 1, and in the further movement of the operating member, the sleeve 1 will be carried around in clockwise direction. In the return movement of the operating member of the gripping device, the inclined faces 13 move away from the respective rollers or chocks 11 so as to free the grips thereof on the sleeve 1, such return movement of the parts therefore being without effect on the driven shaft. When the controlling lever 41 is returned to normal position, the right hand controlling pin 35 rides on the lever arm 34 in such manner as to restore the parts to their normal position wherein the gripping rollers or chocks 11 are free from engagement with either of the inclined faces on the operating lever.

To reverse the mechanism, the controlling lever is moved in the opposite direction and the controlling members are thereby moved clockwise with the result that the shaft is rotated intermittently in the counter clockwise direction.

It is to be understood that when this invention is applied to the operation of the driven parts of automobiles or other apparatus, several of these gripping devices will be mounted on the driven member 1, to provide for continuous rotation thereof by successive operation, as set forth in patent to G. S. Nickum, No. 1,271,207, dated July 2, 1918.

In the above described oscillation of the operating member around the axis of the shaft 2, the extended or flattened toggle b rides under the corresponding pin 35, which holds it down in extended position, while the other pin 35 rides on the periphery of the annular member c, the corresponding toggle b' having been drawn into contracted position, as shown in Fig. 2, and said pin having moved away from said toggle. The resilient support of the shifting arms 16 by the springs 23 enables the slight relative motion of the rolls or chocks 11 necessary for automatic engagement and disengagement of said rollers in the forward and reverse movements of the operating member.

It will be noted that the construction of the members c and d, with two outer rings and an intermediate ring, connected by removable pins 19' and 38', respectively, enable convenient assemblage and taking apart of the said members, while providing rigid connection of said parts in operation, the said pins being held in position, in each case, by the plates 3 extending each side of the members c and d.

What I claim is:

1. A transmission means comprising, in combination with a rotatably mounted driven member, an operating member mounted thereon to oscillate around the axis of said driven member and provided with recesses each having two reversely inclined faces, gripping rollers adapted to engage the driven member and mounted in said recesses to be engaged by said faces alternatively, a controlling member mounted for movement around the aforesaid axis and provided with operating means and shifting means mounted resiliently on said controlling member and engaging said rollers to move same into engagement with one or the other of said faces.

2. In a transmission means, according to claim 1, operating means for said controlling means comprising two toggles, each pivotally connected at one end to said controlling member and at the other end to the oscillating operating member, an annular member mounted for angular movement around the axis of rotation of the driven member, and provided with parts engaging said toggles to extend one or the other of the toggles, and thereby move the controlling member in one or the other direction.

3. A transmission means comprising a driven shaft, a sleeve therein, an annular operating member mounted on said sleeve to oscillate around the axis of said shaft, said annular member being formed with an annular channel, with recesses having two reversely inclined faces, gripping rollers mounted in said recesses, a controlling member mounted to turn in said annular channel and shifting members carried by said controlling member and adapted to engage said rollers to shift same into engagement with one or the other of said inclined faces, toggles connected to said controlling member and to said annular operating member, one of the members of said toggles being formed as a lever and a ring mounted to turn in said annular channel and provided with pins engaging said toggle levers and the toggle members in connection therewith to contract or extend the toggles so as to move said rollers alternately into contact with said inclined faces and thereby enabling forward or reverse operation of the driven shaft.

In testimony whereof I have hereunto subscribed my name this 5th day of December 1918.

WALTER D. NICKUM.

Copies of this patent may be obtained for five cents each, by addressing the "Commissioner of Patents, Washington, D. C."